Jan. 12, 1932.   C. C. PECK ET AL   1,840,600
METHOD OF AND APPARATUS FOR ARC WELDING
Filed Jan. 25, 1928   2 Sheets-Sheet 2
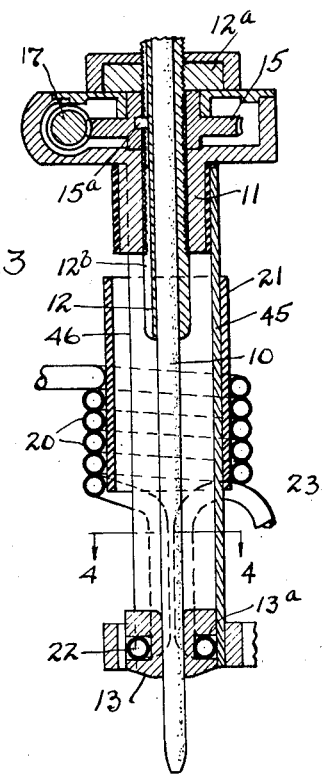
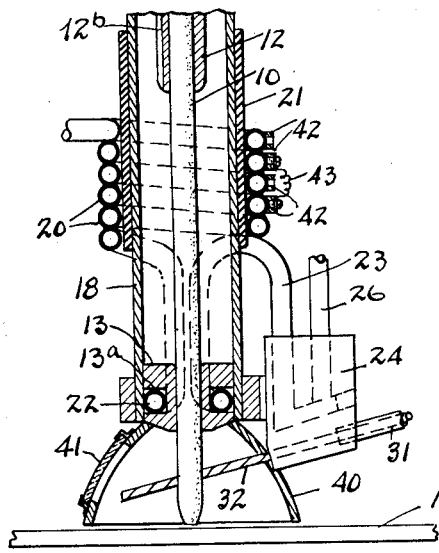
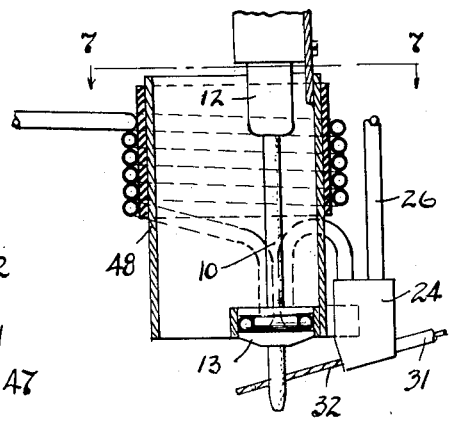
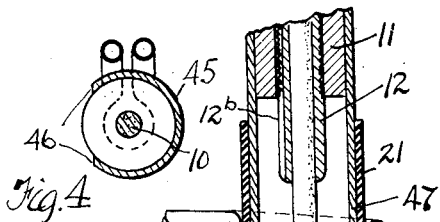
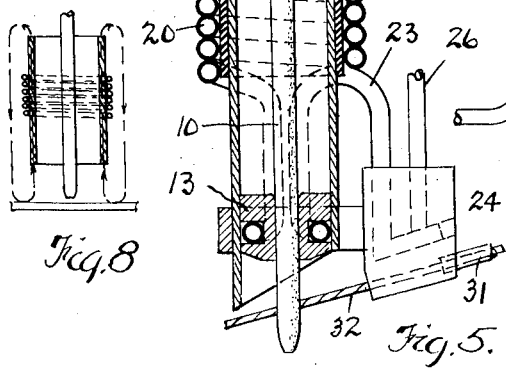
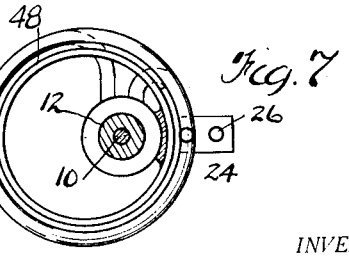
INVENTORS
Cecil C. Peck and
Theophil E. Jerabek
BY Fay, Oberlin & Fay
ATTORNEYS Patented Jan. 12, 1932

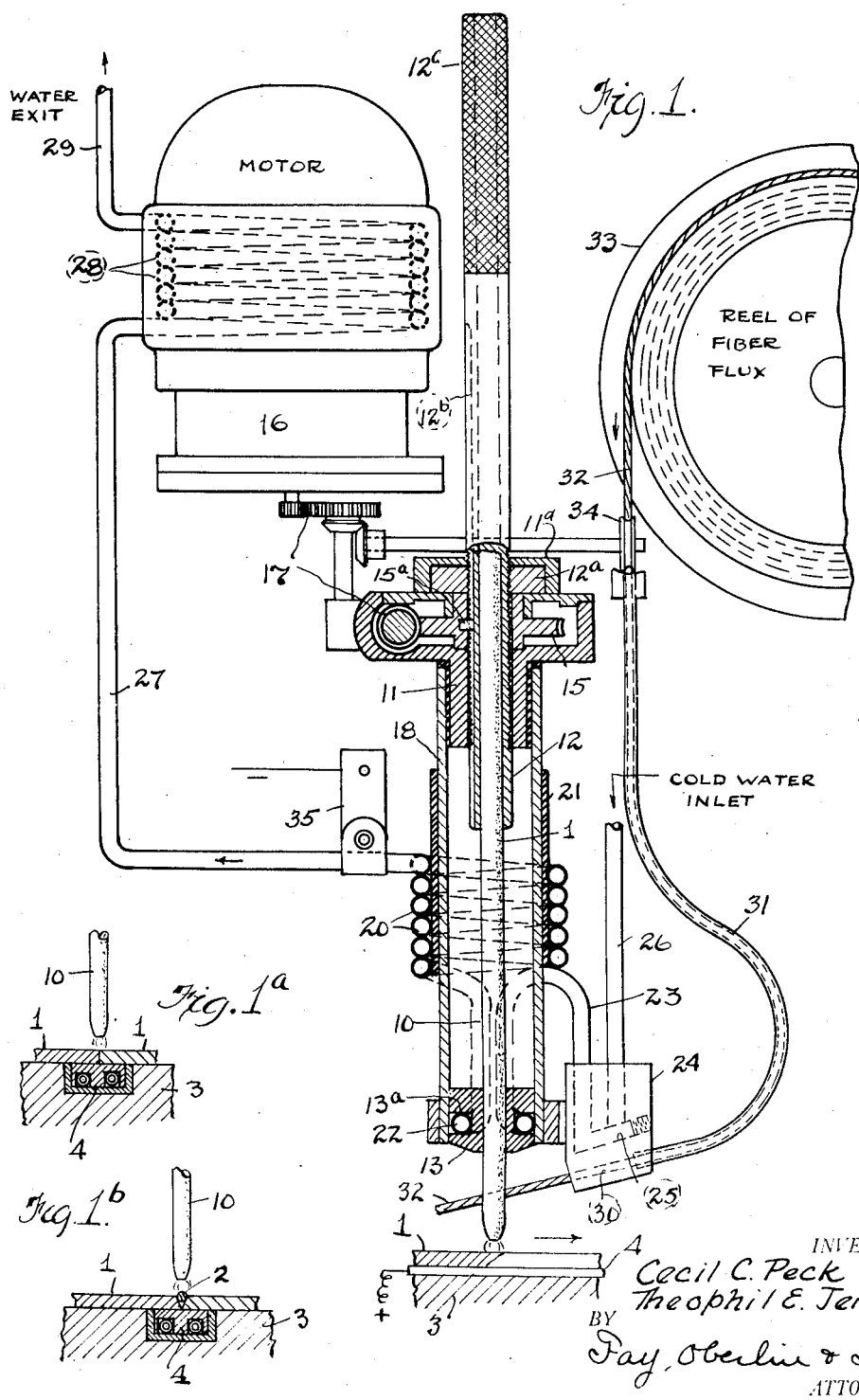

1,840,600

UNITED STATES PATENT OFFICE

CECIL C. PECK AND THEOPHIL E. JERABEK, OF CLEVELAND, OHIO, ASSIGNORS TO THE LINCOLN ELECTRIC COMPANY, OF CLEVELAND, OHIO, A CORPORATION OF OHIO

METHOD OF AND APPARATUS FOR ARC-WELDING

Application filed January 25, 1928. Serial No. 249,267.

The present improvements have more particular regard to methods of and apparatus for electric welding and of working metal by electricity in general, wherein an electric arc is struck between the part or parts to be fused and a carbon electrode that is moved relatively to such parts so as to cause the arc to traverse the work. One serious difficulty that has always been encountered in such arc welding is the tendency of the arc to lag or "stick" as well as to shift irregularly from one point to another on the work.

One of the factors which contribute to such behavior of the arc is the tendency of the latter to go to the hot spot on the work and not leave such spot until the arc is attenuated very much longer than would be the distance to the nearest cold spot. This action is well known and as a result thereof if the welding operation is one in which the metal is not rendered molten entirely through or at least to a considerable depth, the arc will be rather wild and will tend to drag. In addition to the foregoing, there are other magnetic conditions of a variable character which have a considerable influence on the behavior of the arc, these including particularly the magnetic field produced by the flow of the current through the work and the flux induced in the clamps employed to retain the work in place where such work, for example, consists of sheets or plates that require to be firmly clamped to a bed or equivalent support during the welding operation. As indicated, certain of these magnetic conditions are variable and this is particularly true of the effect of the current flow through the work or the mechanism employed in holding the work. For example, it has been observed that in welding together the abutting edges of two sheets or plates, the arc behaves quite differently at either end of the seam than in the intermediate portion thereof.

The general object of the present improvements is to control the direction of "blow" of the arc so as to cause the same to incline in any desired direction from the end of the electrode, for example, forwardly or rearwardly or laterally to either side, having regard to the direction of travel of the electrode relatively to the work. A further object is to obtain a smooth, even action of the arc so as to produce a more nearly perfect weld. Still other objects include an improved construction of holder for the carbon electrode whereby the heating effect of the arc thereon and of the passage of the current therethrough is reduced to a minimum, while at the same time such electrode may be readily adjusted and properly advanced or fed towards the work as the operative end is worn or burns away.

To the accomplishment of the foregoing and related ends the invention, then, consists of the steps and means hereinafter fully described and particularly pointed out in the claims, the annexed drawings and the following description setting forth in detail certain means and one mode of carrying out the invention, such disclosed means and mode illustrating, however, but one of the various ways in which the principle of the invention may be used.

In said annexed drawings:—

Fig. 1 is a partial side elevation and partial central vertical section of an arc welding mechanism or apparatus embodying the present improvements and adapted to operate in accordance with the present improved method, such apparatus being shown as applied to the welding of a longitudinally extending seam between the edges of two juxtaposed plates or sheets of metal; Fig. 1a shows a transverse section through the seam being welded; Fig. 1b is a similar transverse section showing a slightly different arrangement of the work; Fig. 2 is a central vertical section of the welding mechanism similar to that shown in Fig. 1, but showing an additional feature of construction; Fig. 3 is a similar sectional view but showing a modification in construction; Fig. 4 is a transverse section of such modification, the plane of the section being indicated by the line 4—4, Fig. 3; Figs. 5 and 6 are sectional views similar to Fig. 3 but showing still other modifications; Fig. 7 is a transverse section of such last modification, the plane of the section being indicated by the line 7—7, Fig. 6; and Fig. 8 is a diagram showing general distribution of the lines of flux induced by the electro-magnet that features the apparatus.

As indicated, in the arrangement illustrated in Figs. 1, 1a and 1b, the work is shown as consisting of two sheets 1, 1, which may be disposed with the edges thereof that are to be joined together in closely abutting relation (Fig. 1a), or sufficient space may be left between such edges of the sheets or the latter may be slightly beveled so that a filler strip or wire 2 may be inserted therebetween or such strip may be placed so as simply to rest upon the seam (Fig. 1b). This element 2, where employed, will usually be of the same material, i. e., iron or steel, as the metal of the sheets, but may, if desired, contain special alloying constituents or even be of a different metal entirely, so far as the practice of the present invention is concerned. The object of the illustrated operation, it will be understood, is to melt down and interfuse the edges of the sheets 1, 1, (together with the filler strip where one is utilized) so that the resultant seam, as shown at the left-hand end of Fig. 1, will be of substantially the same or greater than the thickness of the sheets and possess a strength and ductility equal to, if not greater than, that possessed by such sheets.

As shown, the sheets 1 are preferably supported on a bed or anvil 3 which will preferably be of steel, except for a strip 4 of copper which is disposed directly beneath the seam and thus below the line of the weld. For the purpose of clamping the sheets 1, 1, onto the supporting bed or anvil, bars (not shown) or other suitable means may be employed, particularly where the work consists of relatively thin sheets, one bar being located on each side of the seam or joint to be welded and at a suitable distance therefrom.

The welding, as also previously indicated, is accomplished by means of an electric arc, a carbon electrode 10 being employed and the welding circuit including such carbon, the work and the bed or anvil 3, or rather the strip 4 which as aforesaid, forms a part thereof. The principal elements of the holder include a body member 11, which may be made of insulating material, a chuck 12 reciprocably mounted in said body member and adapted to grip the electrode 10 and a conductor member 13 supported in spaced relation to said body member and adapted to have movable contact with the electrode close to the working end thereof.

The particular manner in which the holder is movably supported so as to cause the electrode properly to traverse the work forms no part of the present invention. For many uses, the holder may be held manually by the operator and moved over the work. However, if found desirable either on account of the weight of the mechanism or for other reason, it will be understood that a suitable trackway parallel with the seam may be provided upon which said holder may be moved either automatically, or otherwise, carrying with it the electrode and appurtenant parts.

For the purpose of feeding the electrode downwardly, i. e., towards the work, the chuck 12, it will be noted, is externally threaded for engagement with a nut 12a non-rotatably mounted in a housing 11a that forms in effect a part of body member 11; and a worm-gear 15 suitably journaled in the body 11 has a pin 15a that engages with a longitudinal slot 12b in such chuck, so that upon rotation of the worm in the proper direction, the electrode will be rotated and lowered by reason of its threaded engagement with the nut. The latter is preferably formed of split separable sections (not shown), so that it can be disengaged from the chuck, which has its upper end 12c knurled so that it may be raised or lowered within the worm-gear to properly set or adjust the electrode. The worm is designed to be driven by a small motor 16 mounted above body member 11 and operatively connected therewith by suitable gearing 17 that is more or less diagrammatically shown in Fig. 1.

Fixed to and depending from the body member is a cylindrical shell 18 of magnetic material that surrounds the electrode and such portion of the chuck 12 as may project below said body member, the lower end of said shell receiving and supporting in turn the conductor member 13 through which the lower end of the electrode 10 projects, it being noted that said conductor member has sufficiently close fitting contact with the electrode to serve as means for carrying to the latter the necessary welding current. Such current is supplied through a copper tube 20 that surrounds and is supported upon shell 18 in coil form although separated therefrom by an interposed insulation layer 21. The lower end of tube 20 is connected with an approximately circular passage 22 in conductor member 13. In fact such passage is conveniently formed by wrapping the copper tube around said member, or rather in an annular recess 13a initially formed therein, and then filling the leftover space with braze or solder which serves at the same time firmly to unite the portion of the tube in question to the member.

An extension 23 of the tube is similarly carried to or through a shoe 24, attached to the lower end of shell 18, the other end of the passage 25, that forms the continuation of said tube through said shoe, being connected with a tube 26 that constitutes a cold water inlet, being connected with a suitable source of supply (not shown). The other end of tubular coil 20 takes the form of an extension 27 that, as shown, is carried in the form of a second coil 28 around the stator of motor 16 and finally terminates in a water outlet 29.

In addition to the water circulating passage 25 provided in member 24, the latter is formed with a bore or opening 30 in its lower portion that is inclined so as to intersect the axis of the electrode 10 adjacent the lower end of such electrode, and connected with the outer end of such opening 30 is a suitably curved guide tube 31, whereby a strip 32 of carbonaceous material, e. g., of paper twisted in the form of a cord or small rope, is designed to be fed as the welding operation proceeds. Such strip is supplied from a reel 33 from which it is unwound and fed through tube 31 and thence through the opening in nozzle member 24 by means of friction rolls 34 driven by means of the same motor 16 that drives the worm gear 15. It will thus be seen that the strip 32 will be fed simultaneously with the carbon electrode 10 and at a corresponding and predetermined rate.

A clamp 35 attached at a convenient point to the extension 27 of tubular coil 20 serves as a convenient means for making a negative connection with the generator or other source of welding current. Positive connection, as previously stated and as diagrammatically indicated in Fig. 1, is made through the bed or specifically with the strip 4 and thus through the work.

In the case of the construction illustrated in Fig. 1, the holder with the carbon electrode is designed to be moved along the line to be welded in the direction indicated by the arrow adjacent the lower end of said electrode. The path of the current will be through the work, the arc when established, the lower end of the electrode which projects beyond conductor member 13, said conductor member and coil 20 to the negative connection 35 with the generator. It will be understood that the parts of the holder just mentioned will be suitably insulated from other parts of the mechanism, so far as necessary, in order to prevent straying of the current from the indicated path. Current will be simultaneously supplied to the welding circuit and to the motor 16, the supply of current to the motor being controlled by the voltage across the arc or otherwise so as to start and stop as well as reverse said motor, if desired. In order that the arc may be maintained at the proper length, the arrangement just referred to for automatically feeding the carbon electrode will be more important where the holder is supported for movement in a fixed path; where held manually the operator, of course, will directly control the distance between the end of the electrode and the work and the feeding of the electrode by the motor may be at a predetermined rate, subject to manual adjustment from time to time, if necessary, by independent rotation of the chuck 12.

In any event, it will be noted that the strip 32 of fiber flux will be fed into the welding zone at a predetermined rate which may be correlated with the rate of advance of the electrode itself. This strip, as previously described, preferably takes the form of a cord or small rope made of twisted paper and is burned up in the intense heat developed by the arc with the result that, due to the neutral gaseous atmosphere thereby produced, the molten metal does not absorb oxygen or nitrogen or both from the air and so eliminates the harmful effects of such absorption; and there is also much less boiling of the molten metal, the resultant weld congealing into a smooth body without any pronounced ridges or depressions such as ordinarily characterize a welded joint formed by means of an arc of the type in question. These results are apparently, at least in part, attributable not merely to the neutral character of the atmosphere created, but to the fact that the anode drop is kept relatively high and the cathode drop relatively low in the path traversed by the arc. As previously indicated, the strip may be composed of other material than paper, e. g., fiber or other carbonaceous material, that will be consumed in the arc or, in fact, any material that under the temperature conditions that exist in the vicinity of the arc will tend to take up oxygen. The material of such strip may for the purpose in hand be conveniently referred to simply as combustible material. The strip, particularly where it is in the form of a paper rope, may be impregnated with one or more chemicals that will contribute to the effect noted or such chemical impregnating agent may consist of or include a suitable flux as well.

In order to enhance the results obtained by introducing the carbonaceous material at a point approximate to the arc, with or without the other agents mentioned, a hood 40 may be advantageously attached to the lower end of the holder and specifically to the conductor member 13, as shown in Fig. 2. This hood will be preferably made of molded asbestos or equivalent heat insulating material that at the same time is a non-conductor of electricity, and in order that the action of the arc may be observed by the operator, a glass window 41 will be desirably inserted in the side wall of the hood.

There is also illustrated in Fig. 2 a further modification whereby the number of ampere turns in the coil may be varied. While this may be accomplished in various ways, a simple expedient consists in providing successive coils with tapped connections 42 to any selected two of which a jumper 43 may be attached, thus correspondingly shortening the portion of the coil that will be traversed by the current.

The distribution of the lines of flux in the magnetic field developed by the solenoid coil, where the latter is symmetrically disposed around the axis of the electrode as in Figs. 1 and 2, is diagrammatically illustrated in Fig. 8. As there shown, the arc is located centrally with respect to such field and the influence of the latter is relied on to prevent either lagging or wandering of the arc. In other words, the arc is constrained, despite influences that might detrimentally affect or disturb it, to lie in a substantially axial line with respect to the electrode. The effect of maintaining a magnetic field about the arc adapted to exert a directional effect thereon is particularly important where, as in the operation of the present improved apparatus, a combustible material is introduced at a point adjacent to the arc. The magnetic field induced by the coil in such case is made sufficiently strong to overcome any disturbance of the arc that might otherwise be occasioned by the introduction of such material. However, under certain operative conditions or for certain classes of work, it may be found desirable to exert a laterally directional influence on the arc instead of merely such a steadying effect. For example, in the welding of the top to the body of a steel barrel, the tendency of the arc is to blow radially inwardly due to the fact that a substantial mass of metal lies on this side of the periphery of the barrel head, whereas air surrounds the latter on the other side of the circular path of travel. The desired directional effect may be obtained in various ways. Thus, in Figs. 3 and 4, a construction of holder, similar to that shown in Fig. 1, is illustrated except that the tubular core 45 instead of being a complete cylinder as in the construction illustrated in Figs. 1 and 2, has one side cut away. The lines of flux in the resultant magnetic field will be correspondingly displaced in a direction opposite to that in which the opening 46 in such core occurs.

A similar effect will be produced by cutting off one end of the tubular core 47 in a diagonal direction, as illustrated in Fig. 5, while still another way to effect such displacement of the magnetic field is illustrated in Figs. 6 and 7 where the core 48, it will be noted, is of somewhat larger diameter than in the previously described forms of construction and is bodily displaced with respect to the axis of the electrode so that the latter is eccentrically disposed within the magnetic field. In such last mentioned construction, provision may be made, if desired, to shift the core 48 transversely of the electrode so as to vary the distance of the latter from the center of the magnetic field and correspondingly vary the effect on the arc. In other words, the field may be displaced just enough to overcome the effect of external influences to blow the arc in one direction or another.

Other modes of applying the principle of our invention may be employed instead of the one explained, change being made as regards the means and the steps herein disclosed, provided those stated by any of the following claims or their equivalent be employed.

We therefore particularly point out and distinctly claim as our invention:—

1. In arc-welding mechanism, the combination of a body-member, electrode-gripping means supported on said body-member and adapted to hold an electrode in longitudinally reciprocable relation thereto, a conductor-member supported in spaced relation to said body-member and adapted to have movable contact with the electrode close to the working end thereof, a tubular core of magnetic material surrounding the electrode intermediately of said body-member and conductor-member, and a current-carrying coil surrounding said core.

2. In arc-welding mechanism, the combination of a body-member, electrode-gripping means supported on said body-member and adapted to hold an electrode in longitudinally reciprocable relation thereto, a conductor-member supported in spaced relation to said body-member and adapted to have movable contact with the electrode close to the working end thereof, a tubular core of magnetic material surrounding the electrode intermediately of said body-member and conductor-member, and a current-carrying coil surrounding said core and connected in series with said conductor-member.

3. In arc-welding mechanism, the combination of a body-member, electrode-gripping means supported on said body-member and adapted to hold an electrode in longitudinally reciprocable relation thereto, a conductor-member supported in spaced relation to said body-member and adapted to have movable contact with the electrode close to the working end thereof, a tubular core of magnetic material surrounding the electrode intermediately of said body-member and conductor member, and a current-carrying coil surrounding said core, said tubular core being arranged and constructed to cause more lines of flux on one side of the electrode than the other.

4. In arc-welding mechanism, the combination of a body-member, electrode-gripping means supported on said body-member and adapted to hold an electrode in longitudinally reciprocable relation thereto, a conductor-member supported in spaced relation to said body-member and adapted to have movable contact with the electrode close to the working end thereof, a tubular core of magnetic material surrounding the electrode intermediately of said body-member and conductor-member, and a current-carrying coil surrounding said core and connected in series with said conductor-member, said tubular core being arranged and constructed to cause more lines of flux on one side of the electrode than the other.

5. In arc-welding mechanism, the combination of a body-member, electrode-gripping means supported on said body-member and adapted to hold an electrode in longitudinally reciprocable relation thereto, a conductor-member supported in spaced relation to said body-member and adapted to have movable contact with the electrode close to the working end thereof, a tubular core of magnetic material surrounding the electrode intermediately of said body-member and conductor-member, and a current-carrying coil surrounding said core, said tubular core having one side cut away, whereby the lines of flux are concentrated on the opposite side of the electrode.

6. In arc-welding mechanism, the combination of a body-member, electrode-gripping means supported on said body-member and adapted to hold an electrode in longitudinally reciprocable relation thereto, a conductor-member supported in spaced relation to said body-member and adapted to have movable contact with the electrode close to the working end thereof, a tubular core of magnetic material surrounding the electrode intermediately of said body-member and conductor-member, and a current-carrying coil surrounding said core and connected in series with said conductor-member, said tubular core having one side cut away, whereby the lines of flux are concentrated on the opposite side of the electrode.

7. In arc-welding mechanism, the combination of a body-member, electrode-gripping means supported on said body-member and adapted to hold an electrode in longitudinally reciprocable relation thereto, a conductor-member supported in spaced relation to said body-member and adapted to have movable contact with the electrode close to the working end thereof, a tubular core of magnetic material surrounding the electrode intermediately of said body-member and conductor-member, and a current-carrying tubular coil surrounding said core, said coil being connected to a supply of cooling fluid.

8. In arc-welding mechanism, the combination of a body-member, electrode-gripping means supported on said body-member and adapted to hold an electrode in longitudinally reciprocable relation thereto, a conductor-member supported in spaced relation to said body-member and adapted to have movable contact with the electrode close to the working end thereof, a tubular core of magnetic material surrounding the electrode intermediately of said body-member and conductor-member, and a current-carrying tubular coil surrounding said core and electrically connected in series with said conductor-member, said coil also being connected with a supply of cooling fluid.

9. In arc-welding mechanism, the combination of a body-member, electrode-gripping means supported on said body-member and adapted to hold an electrode in longitudinally reciprocable relation thereto, a conductor-member supported in spaced relation to said body-member and adapted to have movable contact with the electrode close to the working end thereof, a tubular core of magnetic material surrounding the electrode intermediately of said body-member and conductor-member, and a current-carrying tubular coil surrounding said core, said coil being connected to a supply of cooling fluid and having an extension in heat-abstracting relation to said conductor-member.

10. In arc-welding mechanism, the combination of a body-member, electrode-gripping means supported on said body-member and adapted to hold an electrode in longitudinally reciprocable relation thereto, a conductor-member supported in spaced relation to said body-member and adapted to have movable contact with the electrode close to the working end thereof, a tubular core of magnetic material surrounding the electrode intermediately of said body-member and conductor-member, and a current-carrying tubular coil surrounding said core and having an extension passing around said conductor-member both in electrical contact therewith and in heat-abstracting relation thereto.

11. In arc-welding mechanism, the combination of a body-member, electrode-gripping means supported on said body-member and adapted to hold an electrode in longitudinally reciprocable relation thereto, a conducter-member supported in spaced relation to said body-member and adapted to have movable contact with said electrode close to the working end thereof, and means adapted to feed a strip of material to a point adjacent to such electrode-end.

12. In arc-welding mechanism, the combination of a body-member, electrode-gripping means supported on said body-member and adapted to hold an electrode in longitudinally reciprocable relation thereto, a conductor-member supported in spaced relation to said body-member and adapted to have movable contact with said electrode close to the working end thereof, means adapted to feed said electrode, and interconnected means adapted simultaneously to feed a strip of material to a point adjacent to such electrode-end.

13. In arc-welding mechanism, the combination of a body-member, electrode-gripping means supported on said body-member and adapted to hold an electrode in longitudinally reciprocable relation thereto, a conductor-member supported in spaced relation to said body-member and adapted to have movable contact with said electrode close to the working end thereof, a guide member attached to said conductor-member, and means adapted to feed a strip of material through said guide member to a point adjacent to such electrode end.

14. In arc-welding mechanism, the combination of a body-member, electrode-gripping means supported on said body-member and adapted to hold an electrode in longitudinally reciprocable relation thereto, a conductor-member supported in spaced relation to said body-member and adapted to have movable contact with said electrode close to the working end thereof, a guide member attached to said conductor-member, means for cooling said guide member, and means adapted to feed a strip of material through said guide member to a point adjacent to such electrode end.

15. In arc-welding mechanism, the combination of a body-member, electrode-gripping means supported on said body-member and adapted to hold an electrode in longitudinally reciprocable relation thereto, a conductor-member supported in spaced relation to said body-member and adapted to have movable contact with said electrode close to the working end thereof, a hood of electrically non-conductive, heat-resisting material depending below said conductor-member and adapted laterally to surround such electrode-end, and means adapted to feed a strip of material into the interior of said hood to a point adjacent such electrode-end.

16. In arc-welding mechanism, the combination of a body-member, electrode-gripping means supported on said body-member and adapted to hold an electrode in longitudinally reciprocable relation thereto, a conductor-member supported in spaced relation to said body-member and adapted to have movable contact with the electrode close to the working end thereof, an electric motor connected to feed the electrode, a tubular core of magnetic material surrounding the electrode intermediately of said body-member and conductor-member, and a tubular current-carrying coil surrounding said core, said coil having an extension passing around said motor, and connections for passing a cooling fluid through said coil.

17. In arc-welding mechanism, the combination of a body-member, electrode-gripping means supported on said body-member and adapted to hold an electrode in longitudinally reciprocable relation thereto, a conductor-member supported in spaced relation to said body-member and adapted to have movable contact with the electrode close to the working end thereof, an electric motor connected to feed the electrode, a tubular core of magnetic material surrounding the electrode intermediately of said body-member and conductor-member, a tubular current-carrying coil surrounding said core and connected in series with said conductor-member, said coil also having an extension passing around said motor, and connections for passing a cooling fluid through said coil.

18. In arc-welding mechanism, the combination of a body-member, electrode-gripping means supported on said body-member and adapted to hold an electrode in longitudinally reciprocable relation thereto, a conductor-member supported in spaced relation to said body-member and adapted to have movable contact with the electrode close to the working end thereof, an electric motor connected to feed the electrode, a guide-member attached to said conductor-member, means adapted to feed a strip of material through said guide-member to a point adjacent the working end of said electrode, a tubular core of magnetic material surrounding the electrode intermediately of said body-member and conductor-member, a tubular current-carrying coil surrounding said core and connected in series with said conductor-member, said coil also having extensions respectively passing around said motor and through said conductor and guide members, and connections for passing a cooling fluid through said coil.

19. In metal working by electricity, the steps which consist in establishing an arc between the work and an electrode, feeding a strip of combustible material to a point adjacent to such arc, and at the same time passing current through a coil surrounding said electrode whereby a directional effect is exerted on such arc sufficient to overcome any disturbance produced by such material.

20. In arc-welding mechanism, for combination with an electrode, a conductor-member adapted to have movable contact with the electrode close to the working end thereof, a tubular core of magnetic material disposed to surround such electrode, and a current-carrying coil surrounding said core and connected in series with said conductor-member.

21. In arc-welding mechanism, for combination with an electrode, a conductor-member adapted to have movable contact with the electrode close to the working end thereof, a tubular core of magnetic material disposed to surround such electrode, a tubular current-carrying coil surrounding said core, and connections for passing a cooling fluid through said coil.

22. In arc-welding mechanism, for combination with an electrode, a conductor-member adapted to have movable contact with the electrode close to the working end thereof, a tubular core of magnetic material disposed to surround such electrode, and a current-carrying coil surrounding said core and connected in series with said conductor-member, said core being unsymmetrical about the axis of the electrode to cause more lines of flux on one side of the electrode than the other.

23. In arc-welding mechanism, the combination of a conductor member adapted to have movable contact with an electrode close to the working end thereof, a tubular core of magnetic material disposed to surround such electrode, and a current-carrying coil surrounding said core.

24. In arc-welding mechanism, the combination of a conductor member adapted to have movable contact with an electrode close to the working end thereof, and means adapted to feed a strip of material to a point adjacent to such electrode-end.

25. In arc-welding mechanism, the combination of a conductor member adapted to have movable contact with an electrode close to the working end thereof, means adapted to feed a strip of material to a point adjacent to such electrode-end, a tubular core of magnetic material disposed to surround such electrode, and a current-carrying coil surrounding said core.

26. In arc-welding mechanism, the combination of a conductor member adapted to have movable contact with an electrode close to the working end thereof, a current-carrying coil surrounding said electrode, and means for varying the magnetic flux produced by said coil without varying the amount of current flow therethrough.

27. In metal working by electricity, the steps which consist in establishing an arc between the work and a carbon electrode, and at the same time applying a magnetic field about such electrode with lines of flux more concentrated on one side of the electrode than the other.

28. In metal working by electricty, the steps which consist in establishing an arc between the work and a carbon electrode, and at the same time passing the arc-producing current in series through such electrode and eccentrically helically thereto, with lines of flux more concentrated on one side than on the other.

29. In metal working by electricity, the steps which consist in establishing an arc between the work and an electrode, feeding a strip of combustible material to a point adjacent to such arc, and at the same time maintaining a magnetic field about such arc adapted to exert a directional effect thereon sufficient to overcome any disturbance produced by such material.

30. In metal working by electricity, the steps which consist in establishing an arc between the work and an electrode, feeding a strip of carbonaceous material to a point adjacent to such arc, and at the same time maintaining a magnetic field about such arc adapted to exert a directional effect thereon sufficient to overcome any disturbance produced by such material.

31. In arc-welding, the step which consists in feeding a strip containing fluxing material into the arc area independently of the rate of feed of the welding electrode.

32. In arc-welding, the step which consists in feeding a strip of carbonaceous material into the arc area independently of the rate of feed of the welding electrode.

33. In arc-welding, the step which consists in feeding a strip of carbonaceous and fluxing material into the arc area independently of the rate of feed of the electrode.

34. In arc-welding, the steps which consist in feeding a strip of fluxing material into the arc area, and varying the rate of such feed during the welding operation independently of the rate of the electrode.

35. In arc-welding, the steps which consist in feeding a strip of carbonaceous material into the arc, and varying the rate of such feed independently of the rate of feed of the electrode relative to the work.

36. In arc-welding, the steps which consist in feeding a strip of carbonaceous material into the arc, and varying the rate of such feed independently of the rate of feed of the electrode as varying amounts of the products of its combustion are required in the arc area.

37. In arc-welding, the step which consists in feeding a strip of impregnated material into the arc.

38. In arc-welding mechanism, the combination of a welding electrode adapted to be presented in arcing relation to the work, and means for producing an unbalanced magnetic field about the arc comprising a current-carrying coil arranged eccentrically around said electrode.

Signed by us, this 23 day of January, 1928.
CECIL C. PECK.
THEOPHIL E. JERABEK.